United States Patent [19]

Löw

[11] Patent Number: 4,823,930

[45] Date of Patent: Apr. 25, 1989

[54] APPARATUS FOR REDISTRIBUTING FLAT ARTICLES

[75] Inventor: Martin Löw, Gächlingen, Switzerland

[73] Assignee: Sig Schweizerische Industrie-Gesellschaft, Neuhausen am Rheinfall, Switzerland

[21] Appl. No.: 131,092

[22] Filed: Dec. 10, 1987

[30] Foreign Application Priority Data

Dec. 23, 1986 [CH] Switzerland ............... 5192/86

[51] Int. Cl.⁴ .............................. B65G 47/68
[52] U.S. Cl. ................... 198/437; 198/442; 198/360
[58] Field of Search ............... 198/360, 361, 367, 436, 198/437, 442, 444, 452

[56] References Cited

U.S. PATENT DOCUMENTS

| | | | |
|---|---|---|---|
| 833,319 | 10/1906 | Gilman | 198/360 |
| 2,451,104 | 10/1948 | Lowe | 198/442 |
| 2,671,549 | 3/1954 | Lubetkin | 198/360 |
| 3,739,901 | 6/1973 | Crispe | 198/452 |

FOREIGN PATENT DOCUMENTS 187588  2/1964  Sweden ...................... 198/436
607967 12/1978  Switzerland .
1282328 7/1972  United Kingdom .

Primary Examiner—Joseph E. Valenza
Attorney, Agent, or Firm—Spencer & Frank

[57] ABSTRACT

A conveyor apparatus includes a first guide assembly defining a plurality of inlet lanes in which inlet columns of flat articles are forwarded in a direction of advance determined by the first guide assembly and a second guide assembly defining a plurality of outlet lanes in which outlet columns of the flat articles are advanced. The outlet lanes are different in number from that of the inlet lanes. A plurality of routing gates is arranged at a discharge end of the inlet lanes. Each routing gate is arranged to be pivoted into one of two end positions for redistributing the articles from the inlet lanes into the outlet lanes. There are further provided separate actuating units operatively connected to separate routing gates for independently operating each routing gate. Each actuating unit comprises a sensor arranged at a respective inlet lane for emitting a signal upon passage of an article on the respective inlet lane and a setting motor connected to a respective routing gate and a sensor for operating the respective routing gate in response to the signal emitted by the sensor.

5 Claims, 4 Drawing Sheets

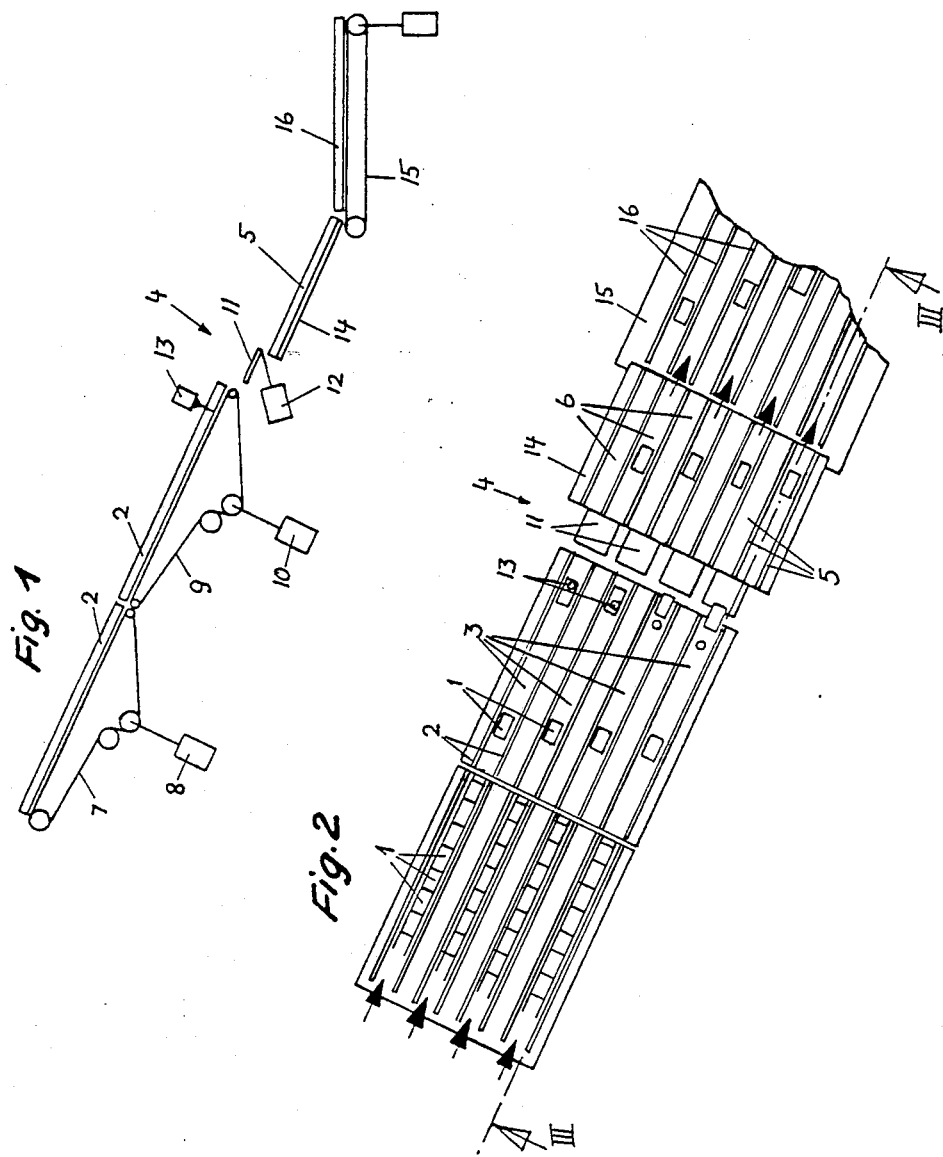

APPARATUS FOR REDISTRIBUTING FLAT ARTICLES

BACKGROUND OF THE INVENTION

This invention relates to an apparatus for redistributing flat articles, particularly confectionery items such as biscuits, cookies or crackers advanced in a plurality of inlet columns on a first conveyor. As a result of the redistribution, the articles are further advanced on a second conveyor in outlet columns, whose number differs from that of the inlet columns. The apparatus includes a plurality of pivoted routing gates which may be swung into either one of two end positions and each of which being associated with a separate inlet column, that is, a separate inlet lane of the first conveyor.

In an apparatus of the above-outlined type, disclosed, for example, in U.K. Pat. No. 1,282,328, the number of inlet columns, formed of incoming articles is increased by redistributing the articles. Each inlet column (inlet lane) is associated with an inclined, flat routing gate which may be pivoted about an axis arranged parallel to the direction of article advance. All the routing gates are controlled by a single common drive with the intermediary of cam discs. In such an arrangement it is required that in all columns the articles reach the routing gates all at the same moment. Further, the motion of the routing gates must be synchronized with the advance of the articles. This requires a complicated aligning and synchronizing system in which the risks of malfunctioning are relatively high.

Swiss Pat. No. 607,967 discloses a grouping apparatus for a single supply column for packaged chocolate bars. Above the supply column there is arranged a sensor which controls, by means of a counter, a routing switch for the further guidance of the products into any one of two possible outlet columns. In this manner, in the outlet columns counted groups of chocolate bars may be formed. The groups are advanced to a packing machine.

SUMMARY OF THE INVENTION

It is an object of the invention to provide an article redistributing apparatus of the above-outlined type in which an alignment of the articles as well as their simultaneous arrival to the routing gates is no longer required.

This object and others to become apparent as the specification progresses, are accomplished by the invention, according to which, briefly stated, each routing gate is equipped with its own sensor which, upon passage of an article emits a signal and further, each routing gate has its own setting motor controlled by the associated sensor.

BRIEF DESCRIPTION OF THE DRAWING

FIG. 1 is a schematic side elevational view of an article redistributing device according to a preferred embodiment of the invention.

FIG. 2 is a schematic top plan view of the construction illustrated in FIG. 1.

DESCRIPTION OF THE PREFERRED EMBODIMENTS

Figure 3:
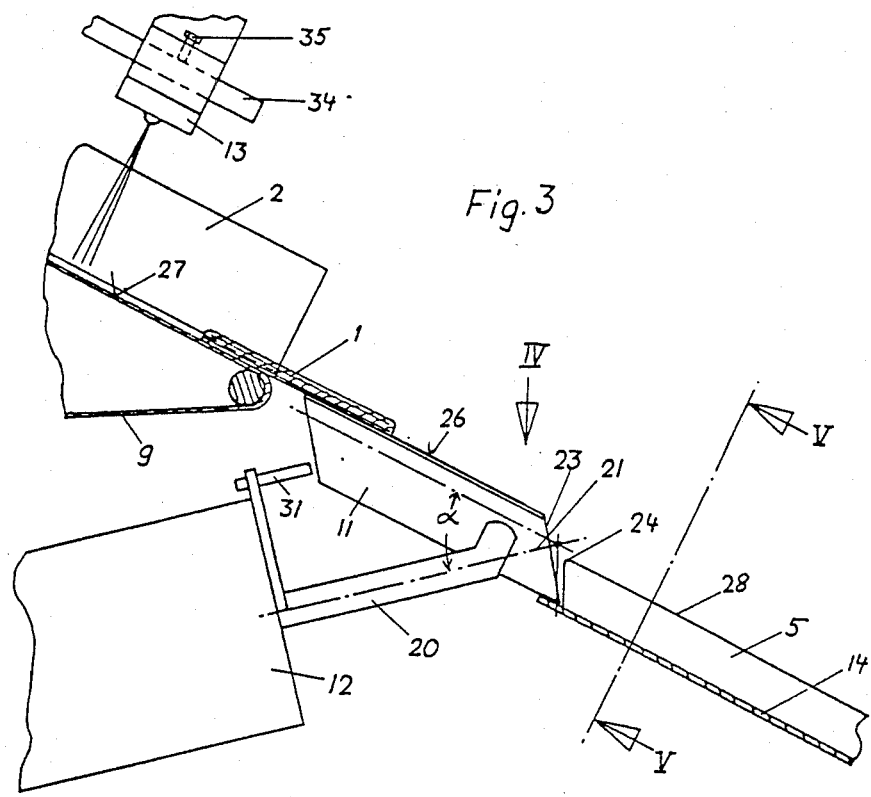
FIG. 3 is a schematic sectional view taken along line III—III of FIG. 2, illustrated on an enlarged scale.

Turning to FIGS. 1 and 2, flat rectangular articles such as biscuits are advanced in four inlet lanes (inlet columns) 3, defined by guide plates 2, to a redistributing device 4 which divides the incoming articles into eight outlet lanes (outlet columns) 6 defined by further guide plates 5. The conveyor system for advancing the articles is formed of an upstream conveyor belt 7 driven by a motor 8 and a downstream, faster running conveyor belt 9 driven by a separate motor 10. This ensures that the articles 1 are separated into columns in a reliable manner.

The redistributing device 4 is formed of four inclined, planar routing gates 11 which are swingable to assume one of two end positions. Each routing gate 11 is associated with a separate inlet lane 3, and is arranged at the downstream end thereof. Each routing gate 11 has its own setting motor 12. Upstream of each routing gate 11 there is arranged a separate sensor formed of a reflected light barrier 13. Upon passage of an article 1 underneath the optical barrier 13, the latter generates a signal which controls the setting motor 12 of the associated routing gate 11. The articles in the outlet lanes 6 first slide on an inclined chute 14 and are then transferred thereby to a horizontal conveyor belt 15 provided with guide plates 16 for advancing the article columns, for example, to a plurality of packing machines.

Figure 4:
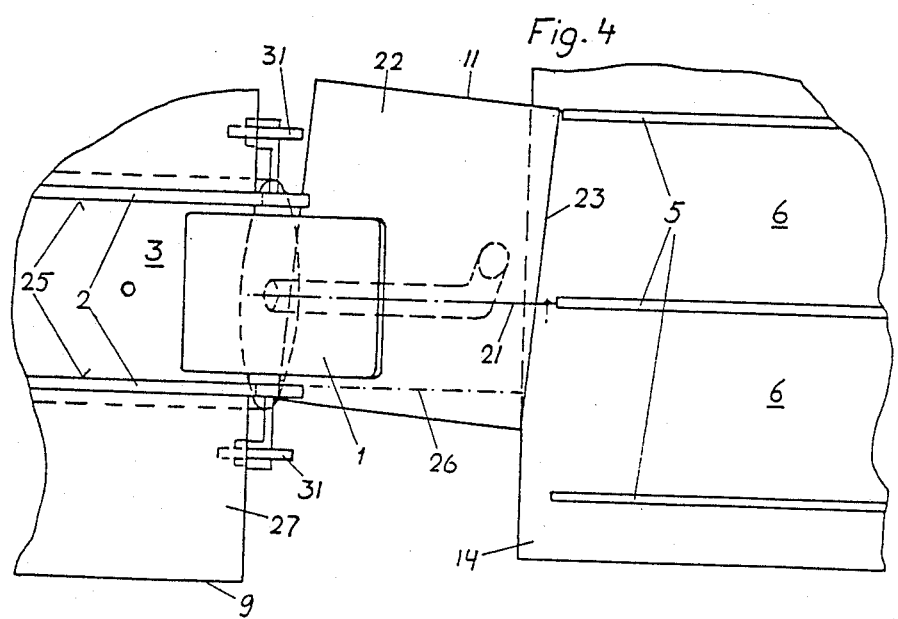
FIG. 4 is a view taken in the direction of the arrow IV shown in FIG. 3.
Figure 5:
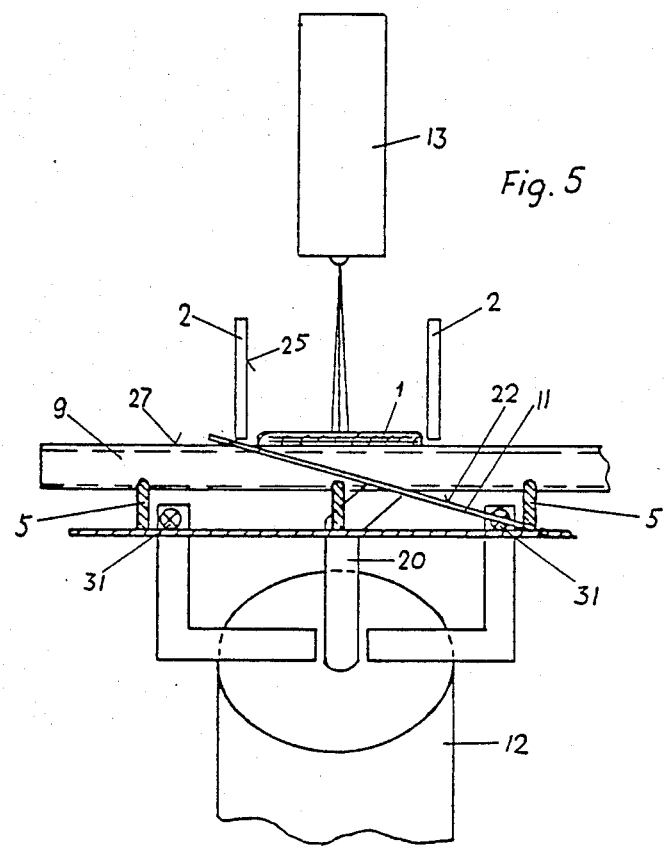
FIG. 5 is a sectional view taken along line V—V of FIG. 3.

Turning now to FIGS. 3, 4 and 5, the redistributing device 4 is illustrated therein on an enlarged scale. The routing gate 11 is a planar plate member which is rigidly connected with a drive shaft 20 which forms part of the setting motor 12 and which is inclined relative to the plane of the routing gate 11 at an acute angle α at a location. The shaft axis 21 traverses the plane of the upper face 22 of the routing gate 11 adjacent the downstream edge 23 thereof and adjacent the upper corner 24 of an adjoining guide plate 5. In the vertical projection as shown in FIG. 4 the shaft axis 21 and one of the guide plates 5 are parallel and symmetrical to two guide plates 2 defining one inlet lane 3. In both end positions of the routing gate 11 the vertical plane defined by the inside surface 25 of one guide plate 2 intersects the upper face 22 of the routing gate 11 along a line 26 which is approximately parallel to the direction of conveyance of the conveyor belt 9 and is at the same height level or is somewhat lower than the plane of the upper side 27 of the conveyor belt 9. The upper face 22 of the routing gate 11 lies above the prolonged upper edge 28 of the guiding plate 5.

By virtue of the described construction of the redistributing device 4 it is achieved that the rectangular articles slide over the routing gates 11 with their longitudinal edges parallel to the direction of advance without changing their orientation and arrive in a properly aligned manner onto the outlet lanes defined by the guide plates 5. The pivotal axis inclined relative to the routing gate plane results in low moments of inertia and makes possible a simple support arrangement and force transmission.

Figure 8:
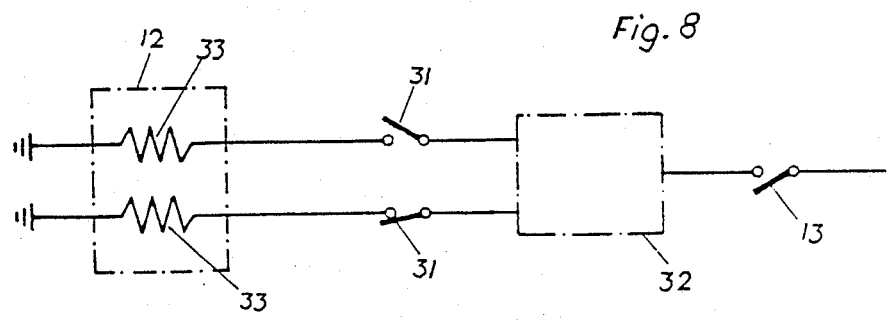
FIG. 8 is a circuit diagram for controlling components of the preferred embodiments.

As a setting motor 12, for example, an "ACR 071 B" model manufactured by Contraves AG of Zurich, Switzerland may be used as a servomotor. For such an arrangement, with the servomotor there are associated two limit switches 31 which determine the two end positions of the routing gate 11. FIG. 8 shows a circuit diagram for such a servomotor. The signal of the optical barrier 13 designated as a switch is applied to a bistable stage 32. Upon receipt of each signal transmitted by the optical barrier 13, the bistable stage 32 assumes its other stable position and, via one or the other limit switch 31 energizes one of two solenoids 33 of the setting motor 12 for the desired forward or reverse run until the associated limit switch 31, upon reaching the terminal position of the routing gate 11 interrupts the electric current. To ensure that the routing gate 11 is switched over before the incoming article 1 is in its zone, the optical barrier 13 is adjustable by displacement on a carrier 34 in the direction of article advance and may be immobilized by a setscrew 35.

By virtue of the above-described control of articles, the latter are, from each inlet column guided on inlet lanes 3, uniformly divided into two outlet columns guided on outlet lanes 6 without the need for an aligning and synchronizing system for the different columns.

Figure 6:
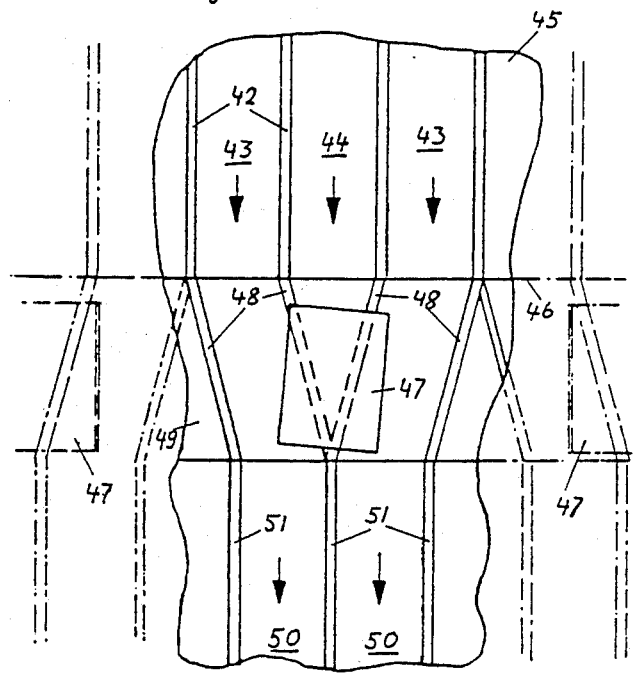
FIG. 6 is a schematic top plan view of one part of another preferred embodiment of the invention.
Figure 7:
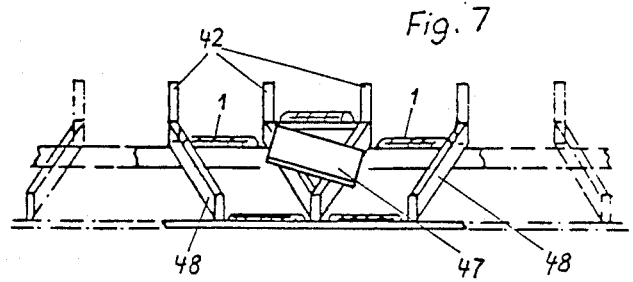
FIG. 7 is a view taken in the direction of the arrow VII shown in FIG. 6.

The redistributing device 4 according to the invention may also be used for reducing the number of outlet columns compared to the number of inlet columns. Such a variant is illustrated in FIGS. 6 and 7 in a schematic manner. A plurality of inlet columns guided by guide plates 42 is divided into three columns in three respective inlet lanes 43, 44 and 43. The conveying means in this embodiment is, instead of a conveyor belt, an inclined plate 45 on which the articles slide. In the middle lane 44 the plate 45 is, at its downstream end 46, at a higher level than that of the two flanking lanes 43. The mid lane 44 is associated with a routing gate 47 which is structured and controlled in a manner identical to that described in FIGS. 1-5 in connection with the routing gates 11. The articles in both flanking lanes 43 are, by means of guide plates 48, guided on an inclined plate 49 directly into the two outlet lanes 50 defined by guide plates 51. The articles advanced in the central inlet lane 44 are distributed by the routing gate 47 uniformly into the one and the other outlet lane 50.

The present disclosure relates to subject matter contained in Swiss Patent Application No. 5192/86 (filed Dec. 23, 1986) which is incorporated herein by reference.

It will be understood that the above description of the present invention is susceptible to various modifications, changes and adaptations, and the same are intended to be comprehended within the meaning and range of equivalents of the appended claims.

What is claimed is:

1. In a conveyor apparatus including first guide means defining a plurality of inlet lanes in which inlet columns of flat articles are forwarded in a direction of advance determined by said first guide means; second guide means defining a plurality of outlet lanes in which outlet columns of the flat articles are advanced; said outlet lanes being situated downstream of said inlet lanes as viewed in said direction of advance and being different in number from that of said inlet lanes; and a plurality of routing gates each arranged at a discharge end of a separate said inlet lane; each said routing gate being pivotally supported and arranged to be pivoted into one of two end positions for redistributing the articles from the inlet lanes into the outlet lanes and actuating means for moving said routing gates from the one into the other of said end positions; the improvement wherein said actuating means comprises separate actuating units operatively connected to separate said routing gates for independently operating each said routing gate; each said actuating unit comprising sensor means arranged at a respective said inlet lane for emitting a signal upon passage of an article on the respective inlet lane and a setting motor connected to a respective said routing gate and said sensor means for operating the respective routing gate in response to said signal; further wherein each said routing gate has an upper face defining a planar article supporting surface, an upstream end oriented towards said first guide means, a downstream end oriented towards said second guide means and a pivotal axis lying in a vertical plane extending parallel to said direction of advance; said pivotal axis intersecting the plane of said upper face at an acute angle in a zone of said downstream end of said routing gate.

2. A conveyor apparatus as defined in claim 1, further wherein each said actuating unit comprises means for allowing an adjustment of the sensor means by shifting the sensor means parallel to said direction of advance.

3. A conveyor apparatus as defined in claim 1, wherein at least one sensor means comprises an optical barrier.

4. A conveyor apparatus as defined in claim 1, further comprising serially arranged first and second conveyors arranged upstream of said routing gates and including said first guide means; and means for driving said second conveyor with a greater speed than that of said first conveyor.

5. A conveyor apparatus as defined in claim 1, wherein said first guide means form part of a conveyor having an article conveying surface; further wherein in both end positions of each said routing gate the upper face of each said routing gate has a low side and a high side; and further wherein in both end positions of each said routing gate a line of intersection between a vertical plane of an inner face of the one or the other first guide means defining the respective inlet lane and the high side of said upper face of the respective routing gate extends at least approximately parallel to said direction of advance and is at a height level not exceeding that of said conveying surface of said conveyor.

* * * * *